United States Patent [19]
Koboyashi

[11] Patent Number: 6,023,447
[45] Date of Patent: Feb. 8, 2000

[54] OPTICAL DISK, RECORDING METHOD AND APPARATUS FOR CANCELING INTERCODE INTERFERENCE

[75] Inventor: Seiji Koboyashi, Kanagawa, Japan

[73] Assignee: Sony Corporation, Tokyo, Japan

[21] Appl. No.: 08/886,740

[22] Filed: Jul. 1, 1997

[30] Foreign Application Priority Data

Jul. 5, 1996 [JP] Japan ............................. P08-195606

[51] Int. Cl.[7] ...................................................... G11B 7/00
[52] U.S. Cl. ......................... 369/59; 369/48; 369/124.02; 369/275.3; 369/275.4
[58] Field of Search ................................ 369/47–50, 54, 369/58, 59, 111, 124, 275.1–275.4, 275.5, 124.02

[56] References Cited

U.S. PATENT DOCUMENTS

| | | | |
|---|---|---|---|
| 5,416,766 | 5/1995 | Horimai | 369/275.1 X |
| 5,517,481 | 5/1996 | Kobayashi | 369/124 |
| 5,533,003 | 7/1996 | Kobayashi | 369/275.4 |
| 5,557,592 | 9/1996 | Kobayashi et al. | 369/48 |
| 5,559,786 | 9/1996 | Horimai et al. | 369/275.1 |
| 5,566,158 | 10/1996 | Kobayashi et al. | 369/48 |
| 5,577,012 | 11/1996 | Kobayashi et al. | 369/48 |
| 5,615,193 | 3/1997 | Kobayashi et al. | 369/59 |
| 5,682,374 | 10/1997 | Horigome et al. | 369/275.3 |
| 5,699,337 | 12/1997 | Kobayashi | 369/59 |
| 5,703,853 | 12/1997 | Horigome et al. | 369/48 |
| 5,724,330 | 3/1998 | Kobayashi et al. | 369/59 |
| 5,729,514 | 3/1998 | Horigome et al. | 369/58 |
| 5,729,518 | 3/1998 | Kobayashi | 369/59 |
| 5,748,582 | 5/1998 | Kobayashi et al. | 369/44.26 |
| 5,748,586 | 5/1998 | Kobayashi et al. | 369/48 |
| 5,790,492 | 8/1998 | Umezawa et al. | 369/54 |
| 5,808,988 | 9/1998 | Maeda et al. | 369/48 |
| 5,809,004 | 9/1998 | Kobayashi et al. | 369/275.3 |
| 5,818,805 | 10/1998 | Kobayashi et al. | 369/59 |

*Primary Examiner*—W. R. Young
*Attorney, Agent, or Firm*—Limbach & Limbach L.L.P.

[57] ABSTRACT

A servo circuit performs tracking control such that the center of scanning is positioned at the center between the track from which data is reproduced and the track immediately before. Then, the beam spot scans the track from which data is to be reproduced and the immediately preceding track at the same time, and a reproduction signal made by inter-code interference between these two tracks is output. A constant relationship is maintained between data specified only by the pit or mark formed on one track and the data specified only by the pit or mark make on the former adjacent track. In this way, pits or marks are formed such that inter-code interference is canceled during reproduction.

7 Claims, 16 Drawing Sheets

FIG. I

FIG. 9
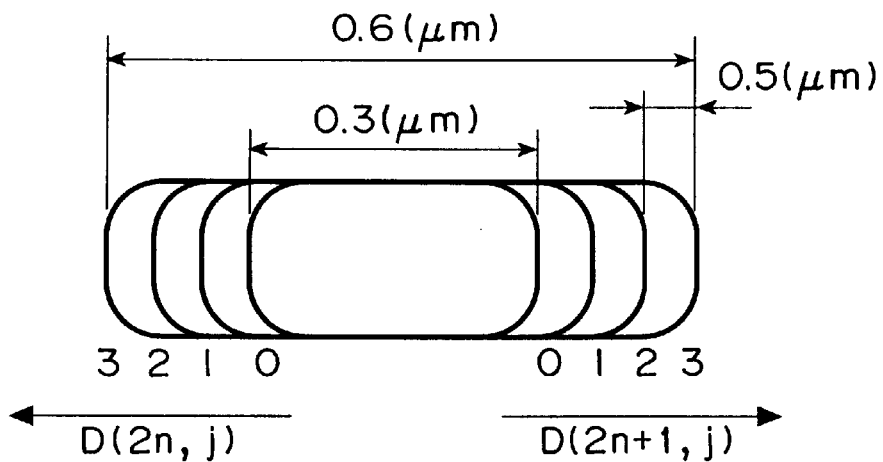
FIG. 10
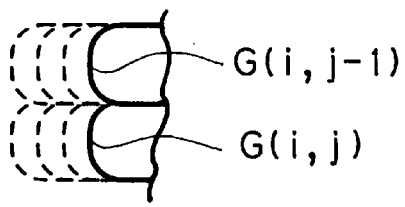
FIG. 11A   FIG. 11B
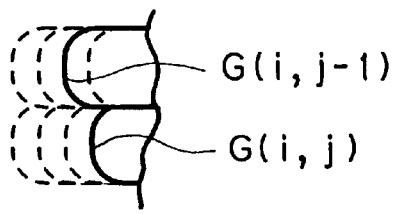   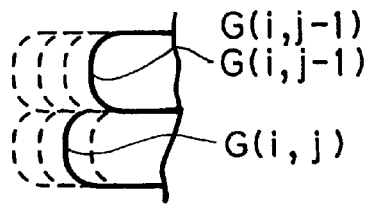

FIG. 17

| G(i,j) | G(i,j-1) | D3 | | AREA VALUE |
|---|---|---|---|---|
| 0 | 0 | 0 | | 0 ( 0 0 0 ) |
| 0 | 1 | 3 | | 4 ( 1 0 0 ) |
| 0 | 2 | 2 | | 4 ( 1 0 0 ) |
| 0 | 3 | 1 | | 4 ( 1 0 0 ) |
| 1 | 0 | 1 | | 1 ( 0 0 1 ) |
| 1 | 1 | 0 | | 1 ( 0 0 1 ) |
| 1 | 2 | 3 | | 5 ( 1 0 1 ) |
| 1 | 3 | 2 | | 5 ( 1 0 1 ) |
| 2 | 0 | 2 | | 2 ( 0 1 0 ) |
| 2 | 1 | 1 | | 2 ( 0 1 0 ) |
| 2 | 2 | 0 | | 2 ( 0 1 0 ) |
| 2 | 3 | 3 | | 6 ( 1 1 0 ) |
| 3 | 0 | 3 | | 3 ( 0 1 1 ) |
| 3 | 1 | 2 | | 3 ( 0 1 1 ) |
| 3 | 2 | 1 | | 3 ( 0 1 1 ) |
| 3 | 3 | 0 | | 3 ( 0 1 1 ) | ically avoided. In recording, laser beams are condensed
OPTICAL DISK, RECORDING METHOD AND APPARATUS FOR CANCELING INTERCODE INTERFERENCE

BACKGROUND OF THE INVENTION

1. Field of the Invention

The present invention relates to optical disks, optical disk apparatuses, methods for recording optical disks, and methods for reproducing optical disks, and more particularly, to an optical disk which records information at a high density and its related apparatuses. The present invention improves the recording density of an optical disk in the radial direction by densely forming tracks such that inter-code interference is generated between adjacent tracks, and by forming pits or marks so as to cancel the inter-code interference.

2. Description of the Related Art

A conventional optical disk is formed such that crosstalk caused by interference between codes from adjacent tracks is effectively avoided.

In a compact disc, which is reproduced in a reproduction apparatus for such an optical disk, a track pitch δ is set to 1.6 μm. In a compact disc player, the wavelength λ and the numerical aperture NA of a reproduction optical system are set against the track pitch δ such that the size of an area image, namely 1.22λ/(2NA), satisfies expression (1).

$$\delta > 1.22\lambda/(2NA) \quad (1)$$

With this setting, the compact disc player reproduces data recorded in a compact disc, with crosstalk between adjacent tracks being effectively avoided.

In contrast, in a magneto-optical disk apparatus, a so-called land/groove recording method is applied. With effective use of the depth-of-focus in a reproduction optical system, crosstalk between adjacent tracks is effectively avoided and information is recorded at higher density. (This method is described, for example, in "LAND/GROOVE RECORDING IN MO SYSTEMS," A. Fukumoto et al., Technical Digest, Optical Data Storage 1995, PP. 117–118.)

In a magneto-optical disk, since grooves for guiding a laser beam and lands formed between grooves have different depths from the surface of the disk, laser beams are condensed separately on grooves and lands, and changes in light returned from marks formed on the grooves and the lands are effectively avoided. In recording, laser beams are condensed separately on grooves and lands, and increases in temperature to the magnetic Curie point or more at the grooves and the lands are effectively avoided. With this configuration, grooves and lands are densely formed at an interval of the size of an area image or less, and the desired data can be recorded into and reproduced from grooves and lands.

In such an optical disk, however, recording density in the track direction is smaller than that in the circumferential (line) direction. In a compact disc, for example, recording density in the line direction is about 0.6 μm/bit whereas the track pitch is 1.6 μm. This means that recording density in the line direction and that in the track direction differ by a factor of 2.7.

To solve this problem, a method of land/groove recording, which is applied to a magneto-optical disk, can be considered. It is, however, practically difficult to apply the method to an optical disk which records information with the use of pits, such as a compact disc. Since a pit and a groove are formed by the same method, it is difficult to form a pit among grooves. In addition, for effectively preventing crosstalk from being generated, grooves must be maintained in their ideal shape, and hence mass production is difficult.

SUMMARY OF THE INVENTION

The present invention is made in consideration of the foregoing points. Accordingly, it is an object of the present invention to provide an optical disk which can record and reproduce the desired data and which has tracks formed at a higher density than that for a conventional disk, an optical disk apparatus therefor, a recording method therefor, and a reproduction method therefor.

The foregoing object is achieved in one aspect of the present invention through the provision of an optical disk, an optical disk apparatus, or a recording method for an optical disk, wherein tracks are densely formed such that inter-code interference is generated between adjacent tracks, and pits or marks are formed such that the inter-code interference is canceled.

The foregoing object is achieved in another aspect of the present invention through the provision of an optical disk or an optical disk apparatus, wherein pits or marks are sequentially formed on a plane, and tracks or a reproduction optical system is formed such that the relationship of δ<1.22λ/(2NA) is satisfied.

The foregoing object is achieved in still another aspect of the present invention through the provision of an optical disk apparatus or a reproduction method for an optical disk, wherein the spot of an optical beam scans a plurality of tracks on a disk-shaped recording medium at the same time, and light changed by and returned from pits or marks on the plurality of tracks is received.

In an optical disk, an optical disk apparatus, or a recording method for an optical disk, when tracks are densely formed such that inter-code interference is generated between adjacent tracks, track density is increased accordingly and recording density is also increased. In this case, when pits or marks are formed such that the inter-code interference is canceled, data can be reproduced from the desired track while the effect from adjacent tracks is effectively avoided.

In an optical disk or an optical disk apparatus, when pits or marks are sequentially formed on a plane, and tracks or a reproduction optical system is formed such that the relationship of δ<1.22λ/(2NA) is satisfied, tracks are formed more densely than in a conventional disk or a conventional disk apparatus. In this case, since a reproduction signal in which inter-code interference is generated between adjacent tracks during reproduction is processed with this interference being taken into account, data can be reproduced from the desired track.

In an optical disk apparatus or a reproduction method for an optical disk, when the spot of an optical beam scans a plurality of tracks on a disk-shaped recording medium at the same time, and light changed by and returned from pits or marks on the plurality of tracks is received, a reproduction signal can be obtained from a narrow-track-pitch optical disk in which tracks are formed such that inter-code interference is deliberately generated.

BRIEF DESCRIPTION OF THE DRAWINGS

FIG. 9 is a plan showing details of a pit formed by the edge modulator shown in FIG. 8.

FIG. 10 is a plan showing a state in which adjacent pits have their edges at the innermost positions.

FIGS. 11A and 11B are plans showing a state in which the edge positions change following the state shown in FIG. 10.

FIG. 17 shows the relationship between the data and the edge positions of adjacent pits.

DESCRIPTION OF THE PREFERRED EMBODIMENT

Figure 1:
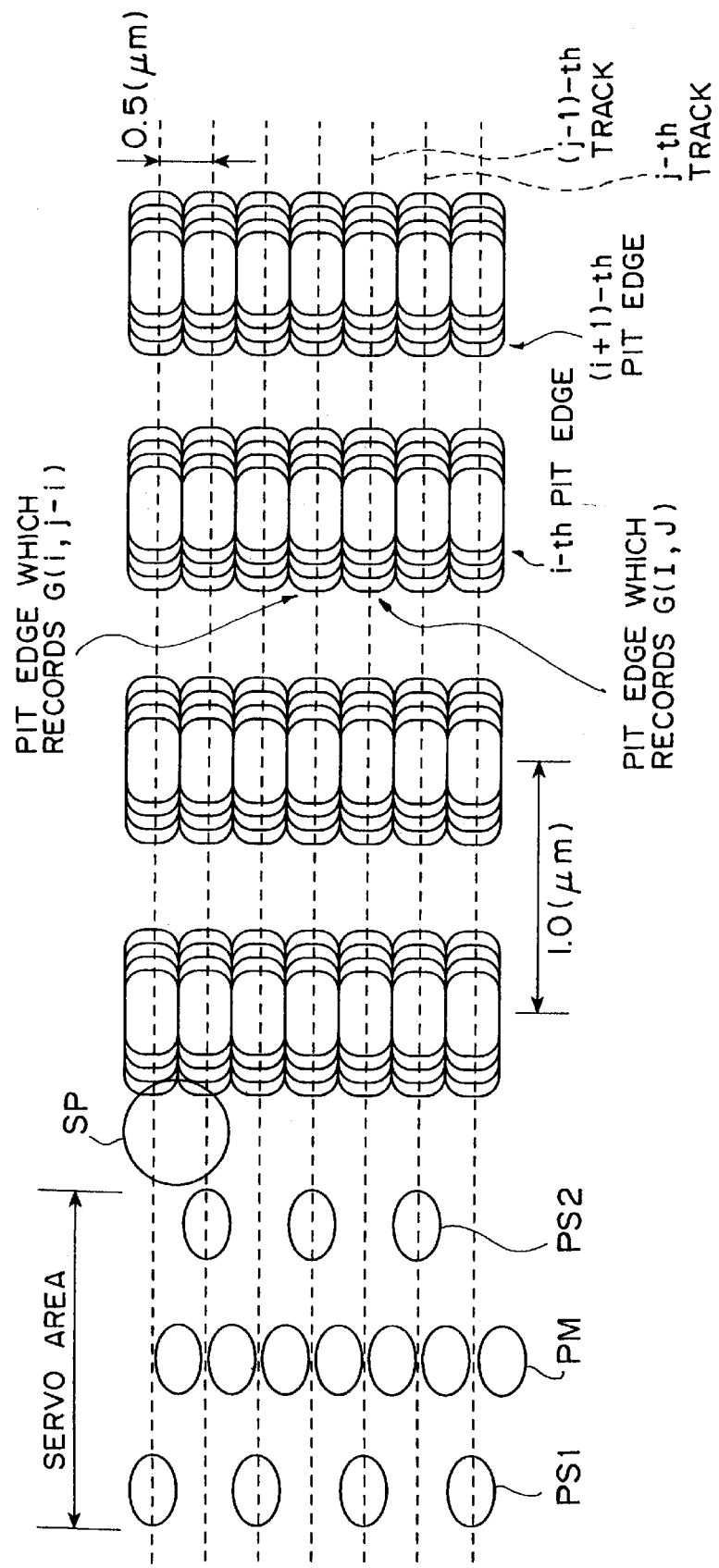
FIG. 1 is an outlined diagram of an optical disk according to an embodiment of the present invention.

An embodiment of the present invention will be described below in detail by referring to the drawings.

Figure 2:
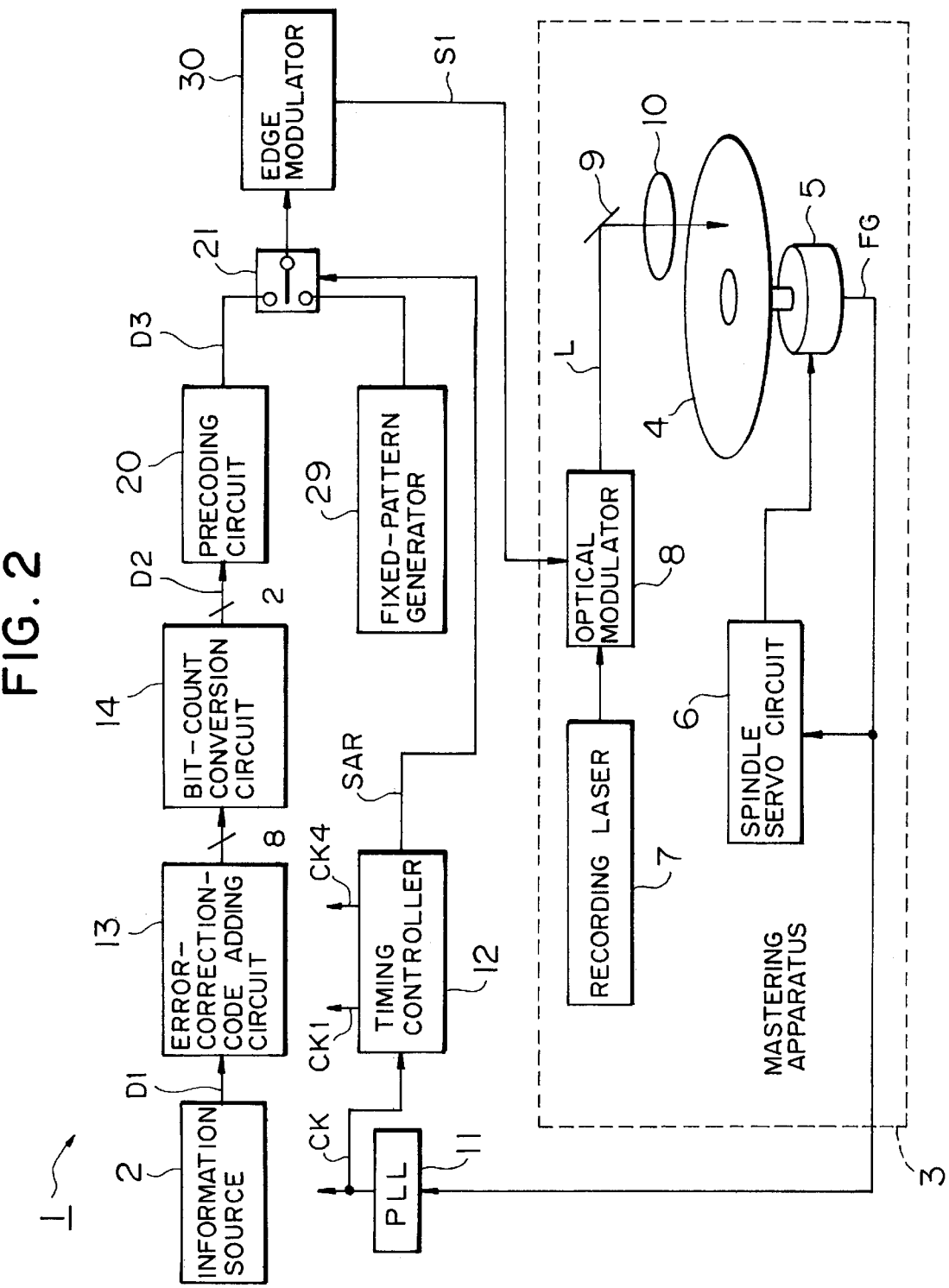
FIG. 2 is a block diagram of an optical disk apparatus for data recording.

FIG. 2 is a block diagram of an optical disk apparatus according to an embodiment of the present invention. An optical disk apparatus 1 generates a modulation signal S1 according to data D1 output from an information source 2 including tape and a disk, and drives a mastering apparatus 3 with this modulation signal S1 to expose an optical original disk 4 to light.

Photo resist on a surface of the original disk 4 is partially exposed to form pits in the mastering apparatus 3, and electrical plating is applied in a different process.

In the mastering apparatus 3, a spindle motor 5 rotates the original disk 4 and an FG-signal generator held at the bottom of the spindle motor 5 outputs an FG signal FG. The FG-signal generator is set such that it outputs 4200 pulses per one rotation of the spindle motor 5, and therefore, the spindle motor 5 detects the angle of rotation and the rotation speed with the use of this FG signal. A spindle servo circuit 6 drives the spindle motor 5 such that the FG signal has the specified frequency. The original disk 4 is rotated at the specified rotation speed under the condition of a constant angular velocity.

A recording laser 7, such as a gas laser, emits a laser beam L for exposing the original disk. An optical modulator 8 controls the on-off of laser beam L according to the modulation signal S1 and emits it. A mirror 9 changes the optical path of the laser beam L and emits it toward the original disk 4. An objective 10 condenses the laser beam L on the original disk 4. The mirror 9 and the objective 10 sequentially move in the radial direction of the original disk 4 by a sled mechanism not shown in synchronization with the rotation of the original disk 4. With this movement, a position where the laser beam L is condensed sequentially moves in the radial direction of the original disk 4.

With this configuration, the mastering apparatus 3 rotates the original disk 4 under the condition of a constant angular velocity and sequentially exposes the original disk 4 according to the modulation signal S1 to form a spiral track with a pit string.

To form a pit string according to the modulation signal S1 as described above in the mastering apparatus 3, the feed speed of the mirror 9 and the objective 10 is set to about a half of that for a compact disc apparatus such that adjacent pits in the radial direction of the original disk 4 are very closely formed. With this system, in the optical disk apparatus 1, recording tracks are densely formed such that inter-code interference is generated between adjacent tracks.

More specifically, recording tracks are densely made in the present embodiment such that the track pitch $\delta$ satisfies $\delta < 1.22\lambda/(2NA)$ against the size of an area image, namely $1.22\lambda/(2NA)$, in the reproduction optical system. In addition, the wavelength $\lambda$ of a laser beam L and the numerical aperture NA of the optical system including the objective 10 are specified such that pits do not overlap between adjacent tracks even with this track pitch $\delta$.

The optical disk apparatus 1 sequentially manipulates data D1 to generate a modulation signal S1 in synchronization with the rotation of the original disk 4 in the mastering apparatus 3. A PLL circuit 11 generates a clock CK which serves as the operation reference for the optical disk apparatus 1, from the FG signal FG. A timing controller 12 generates an edge clock CK1 based on the clock CK, and further generates a byte clock CK4 by scaling down the edge clock CK1 by a factor of four. The optical disk apparatus 1 manipulates data D1 by the use of the edge clock CK1 and the byte clock CK4. The timing controller 12 also generates and outputs a timing signal SAR which rises to its high logical level in correspondence to the servo area of the original disk 4.

An error-correction-code adding circuit 13 receives eight-bit-parallel data D1 in synchronization with the byte clock CK4 and attaches an error correction code based on the Reed-Solomon code to the data D1. The error-correction-code adding circuit 13 generates this error correction code by the same method as that usually applied to a compact disc to increase the redundancy of the data D1 to reduce bit errors during reproduction. The circuit 13 handles data D1 in units of eight bits and outputs the data D1 to which an error correction code is attached in units of eight bits.

Figure 3:
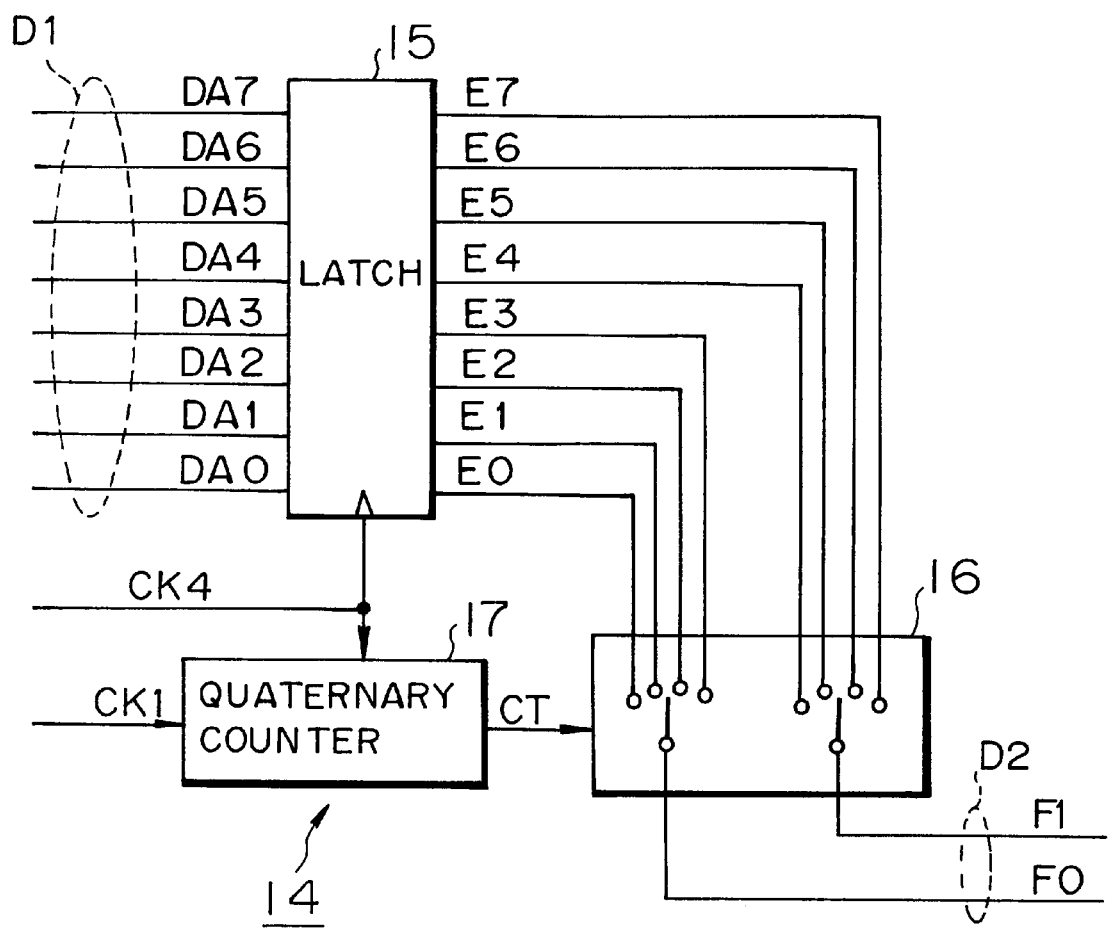
FIG. 3 is a block diagram of a bit-count conversion circuit of the optical disk apparatus shown in FIG. 2.

A bit-count conversion circuit 14 converts eight-bit-parallel data output from the error-correction-code adding circuit 13 into two-bit-parallel data D2 and outputs it. In other words, as shown in FIG. 3, in the bit-count conversion circuit 14, an eight-bit latch circuit 15 latches data D1 at the timing of the byte clock CK4 and sends its output to a selector 16. A quaternary counter 17 is initialized by the byte clock CK4, counts the edge clock CK1, and outputs a count value CT which changes among value 0 to value 3 sequentially in synchronization with the edge clock CK1. The selector 16 is formed by two selection circuits which select from low-order four bits E0 to E3 and high-order four bits E4 to E7 of the latch output of the latch circuit 15 and output the results respectively. The selector 16 changes the contacts of the selection circuits in parallel at the same time correspondingly to the count value CT of the quaternary counter 17.

Figure 4:
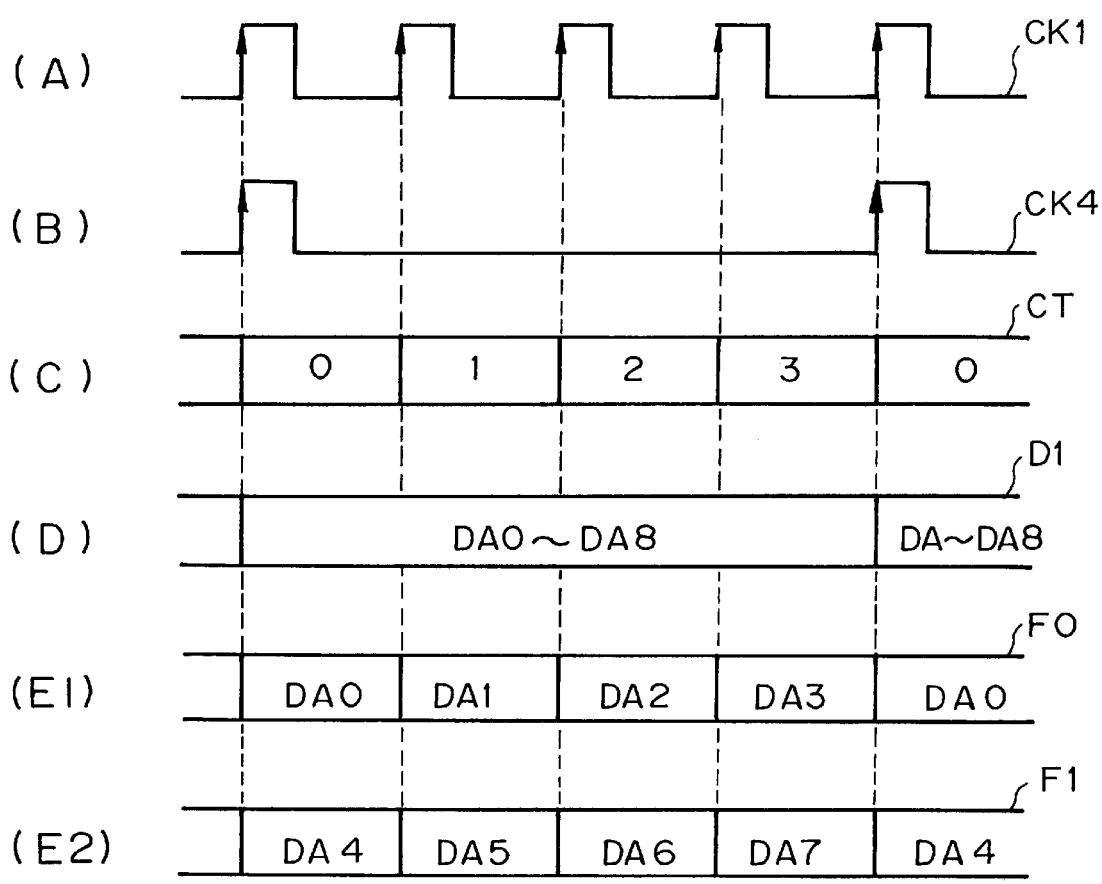
FIG. 4 (including subparts A–D, E1, E2) is a signal waveform chart indicating operations of the bit-count conversion circuit shown in FIG. 3.

With this configuration, as shown in FIG. 4, the bit-count conversion circuit 14 updates the count value (FIG. 4(C)) of the quaternary counter 17 at the timing of the edge clock CK1 (FIG. 4(A)) and the byte clock CK4 (FIG. 4(B)), converts eight-bit-parallel data D1 (FIG. 4(D)) into two-bit-parallel data D2 (indicated by F0 and F1 in FIGS. 4(E1) and 4(E2)) according to the count value CT, and outputs the result.

A precoding circuit 20 compensates for data D2 such that inter-code interference caused by densely formed tracks in the mastering apparatus 3 is canceled. More specifically, the precoding circuit 20 compensates for data D2 so as to maintain a constant relationship between the data value specified only by the pit formed by data D2 and the data value specified only by the pit on the previous track which causes inter-code interference with data D2 to be recorded. In other words, the precoding circuit 20 compensates for data D2 such that the original data D2 can be decoded during reproduction with the use of this relationship even if it receives inter-code interference from adjacent tracks.

Figure 5:
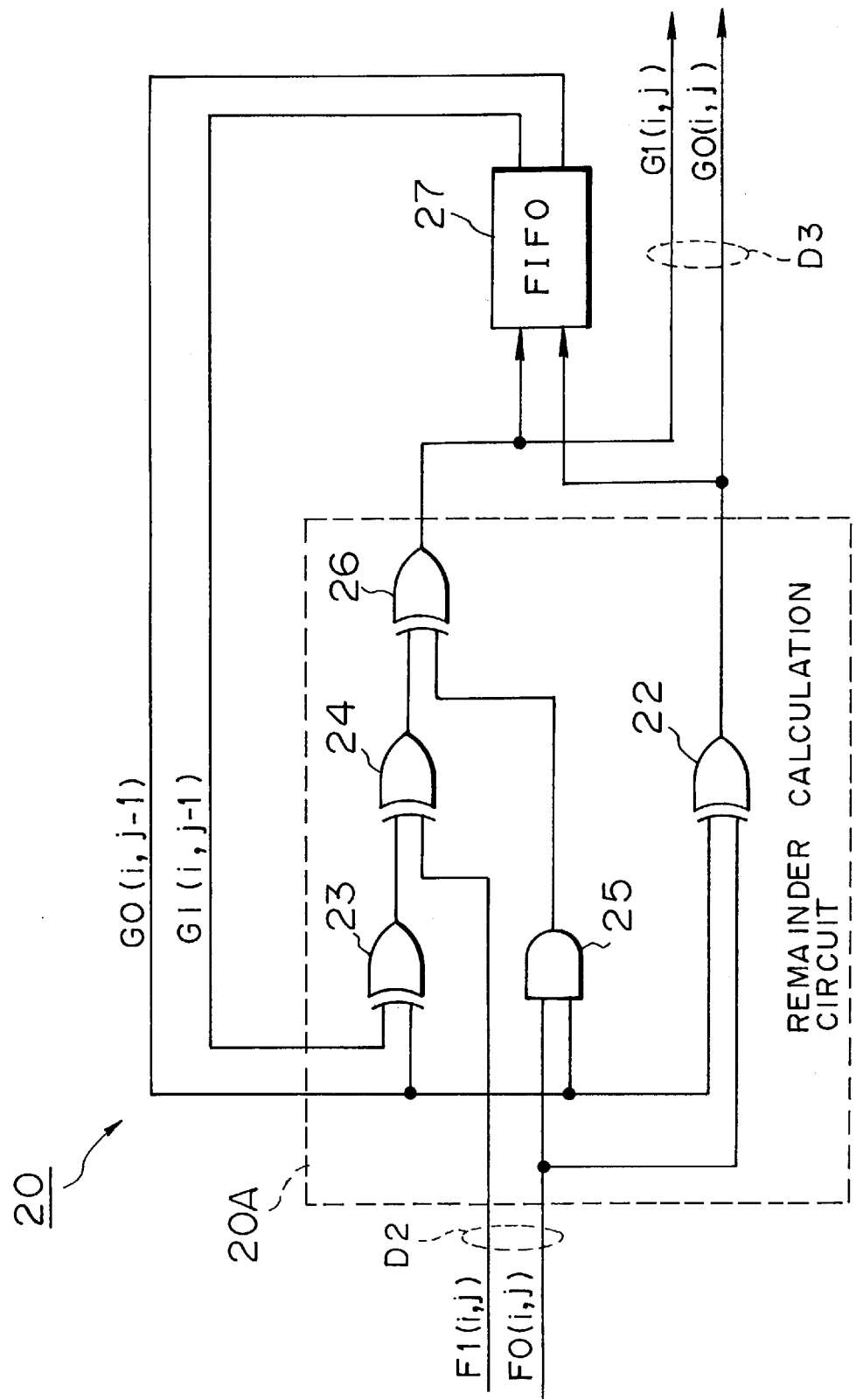
FIG. 5 is a block diagram of a precoding circuit of the optical disk apparatus shown in FIG. 2.

As shown in FIG. 5, in the precoding circuit 20, data D2 output from the bit-count conversion circuit 14 is input to a remainder calculation circuit 20A. The remainder calculation circuit 20A subtracts the data D2 recorded on the previous adjacent track on the original disk 4 (corresponding to data D3 which has been compensated for by this precoding circuit 20A) from the current data D2, and calculates a remainder from the subtraction result with a modulus of value four.

In the remainder calculation circuit 20A, an exclusive OR circuit 22 receives the low-order bit G0(i, j-1) of the data D3 recorded on one track previous and the low-order bit F0(i, j) of the current data D2, and calculates exclusive logical OR between these bits as the low-order bit G0(i, j) of the new data D3.

An exclusive OR circuit 23 receives the bits G0(i, j-1) and G1(i, j-1) of the data D3 recorded on one track previous, and calculates exclusive logical OR of these bits. An exclusive OR circuit 24 calculates the exclusive logical OR value of the output of the exclusive OR circuit 23 and the high-order bit F1(i, j) of the data D2. An AND circuit 25 calculates the logical AND value of the output of the low-order bit G0(i, j-1) of the data D3 recorded on one track previous and the low-order bit F0(i, j) of the data D2 as a carry from the low-order bits. An exclusive OR circuit 26 calculates the exclusive logical OR of the output of the exclusive OR circuit 24 and the carry to obtain the high-order bit G1(i, j) of the new data D3.

The remainder calculation circuit 20A outputs the data D3 to a selection circuit 21 and also feeds back the data D3 to its inputs through a FIFO 27 which generates a delay time corresponding to a quarter rotation of the original disk 4. With this configuration, the precoding circuit 20 compensates for data D2 successively and outputs it. The FIFO 27 adds a delay time corresponding to 2N bits at a data D3 clock against the number N of pits formed on one quarter of the original disk 4.

The selection circuit 21 (FIG. 2) switches contacts according to a timing signal SAR. It selectively outputs a fixed data for servo pattern generation output from a fixed-pattern generator 29, in the servo area of the original disk 4. Therefore, the selection circuit 21 inserts the fixed data for servo pattern generation into data D3 at a constant interval.

Figure 6:
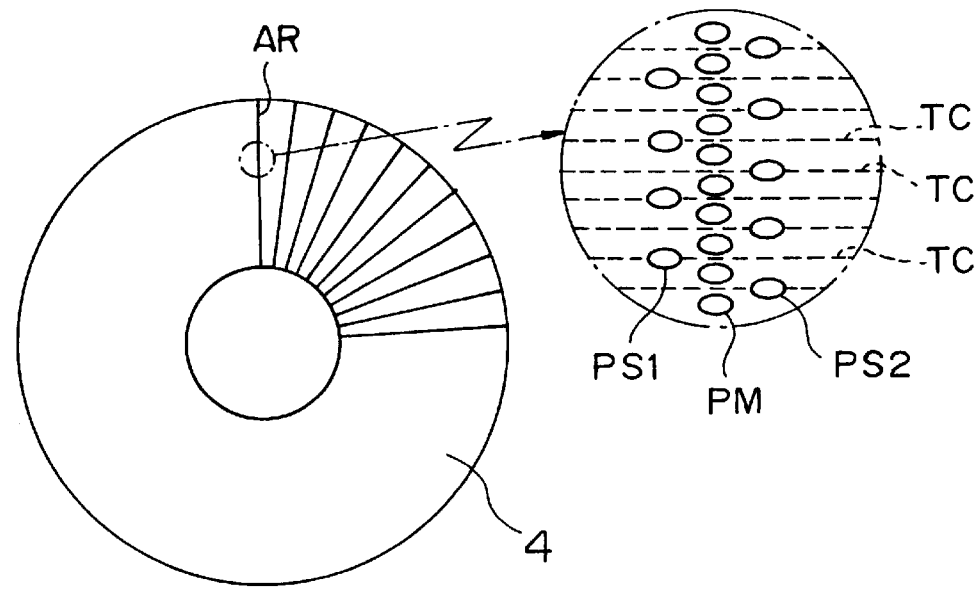
FIG. 6 is a plan illustrating a servo area of an optical disk made by the optical disk apparatus shown in FIG. 2.

The fixed-pattern generator 29 generates a fixed data for so-called sample servo. The generator 29 also switches fixed data between odd-number tracks and even-number tracks. As shown in FIG. 6 with a partially enlarged view, the optical disk apparatus 1 forms servo areas AR radially, and generates a servo pattern which changes its arrangement in a radial direction, in units of two tracks in each servo area AR.

When tracks are densely formed so as to cause inter-code interference as in the present embodiment, correct tracking control is difficult to achieve with the use of side spots as in a compact disc player. When pits adjacent to a track center pit are disposed with offsets in the radial direction as in general sample servo, correct detection of the track center becomes difficult.

In contrast, adjacent pits PS1 and PS2 are disposed at the track centers of an even-number track and an odd-number track in the present embodiment. A center pit is disposed at the middle of the track centers. Thus a servo pattern is formed in which radial arrangement changes in units of two tracks with an offset of half track. In reproduction, correct tracking control is performed by common use of pit PS1 or PS2 with a center pit PM in an even-number track or an odd-number track with a track center being offset by a half track. These pits PM, PS1, and PS2 are also used for generating the clock CK.

Figure 7:
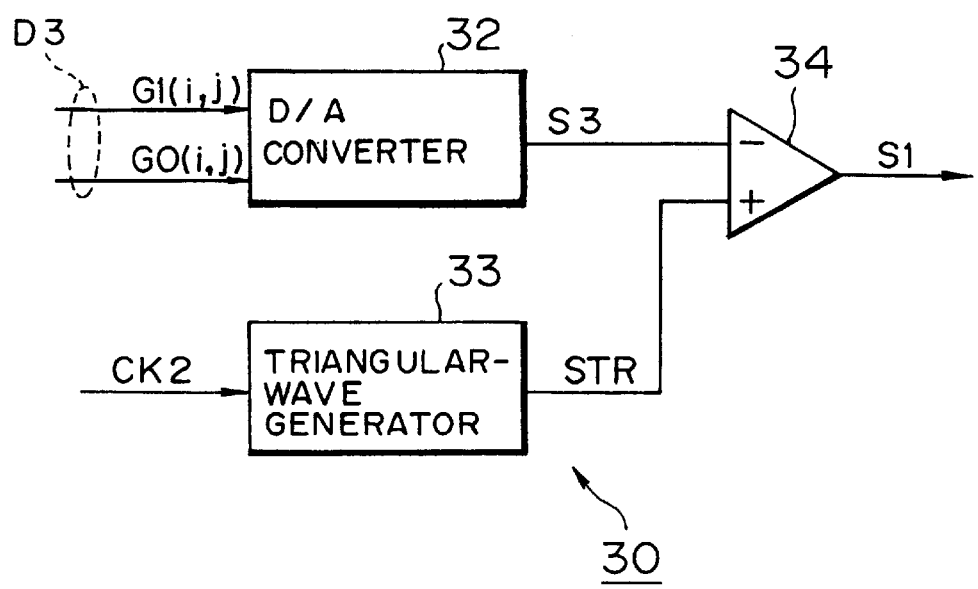
FIG. 7 is a block diagram of an edge modulator in the optical disk apparatus shown in FIG. 2.
Figure 8:
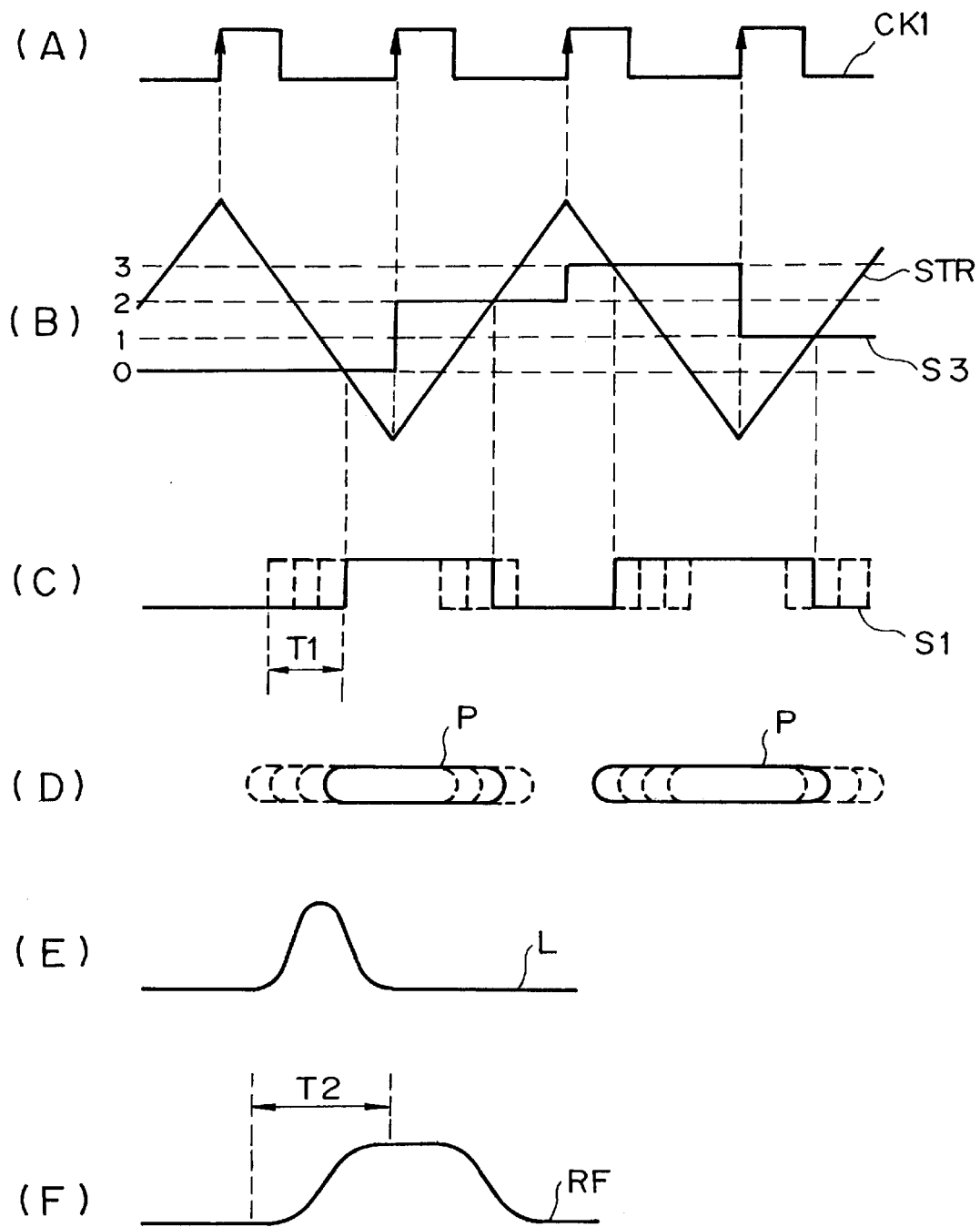
FIG. 8 (including subparts A–F) is a signal waveform chart indicating operations of the edge modulator shown in FIG. 2.

An edge modulator 30 generates a modulation signal S1 for driving the mastering apparatus 3, from data D3 output from the selection circuit 21. As shown in FIG. 7, the data D3 output from the selection signal 21 is input to a digital-to-analog (D/A) converter 32 and converted to an analog signal S3 having one of four values. A triangular-wave generator 33 generates a triangular wave STR (FIG. 8(B)) having a period twice that of the edge clock CK1 according to the edge clock CK1 (FIG. 8(A)) as shown in FIG. 8.

A comparator 34 compares the triangular-wave signal STR with the signal S3 (FIG. 8(B)) output from the D/A converter 32 and outputs the result as a modulation signal S1 (FIG. (C)). Thus, the edge modulator 30 outputs a modulation signal S1 generated by an edge-position change, according to the output data D3. Therefore, pits P (FIG. 8(D)) which change its edge positions are formed on the original disk 4 according to the modulation signal S1.

To change the edge position, the edge modulator 30 is set such that the triangular-wave signal STR and the output signal S3 change at appropriate signal levels. Therefore, the edge position of a pit P can be changed by a certain shift period shorter than the transitional response time of a reproduction signal for the pit P, which is determined by the transfer characteristics of the reproduction optical system.

In the reproduction optical system, a laser beam L (FIG. 8(E)) having a Gaussian distribution is emitted and a reproduction signal RF (FIG. 8(F)) which changes its signal level according to the amount of light returned is generated. In this case, since the reproduction signal RF changes its level according to a pit area covered by the size of an area image $1.22\lambda/(2NA)$, the signal level changes (FIG. 8(F)) according to a certain transitional response characteristics determined by the characteristics of the reproduction optical system. In the present embodiment, an edge change time T1 of a modulation signal S1 is set shorter than the transitional response time T2 specified by the above transitional response characteristics so that the edge position of a pit P can be changed by using as a unit the area corresponding to a certain shift period shorter than the transitional response time T2.

Since the triangular-wave generator 33 generates the triangular-wave signal STR having a period twice that of the edge clock CK1, an edge position can be made variable at the front and back edges of a pit as shown in FIG. 9 and recording is performed with one word (two bits) of data D2 being assigned to each edge.

With this configuration, the optical disk apparatus 1 sequentially exposes the original disk 4 and forms pits which have different edge positions, in the radial direction very closely to each other as shown in FIG. 1.

As described above, since tracks are formed very closely and the track pitch $\delta$ is set smaller than the size of an area image in the reproduction optical system, namely $1.22\lambda/(2NA)$, a beam spot SP scans over two tracks as shown in FIG. 1 during reproduction. Assuming that the beam spot SP scans at a boundary to adjacent tracks, since the edge position changes to any of four levels, the pit area covered by the beam spot SP changes to any of seven levels according to the edge positions.

Figure 12A:
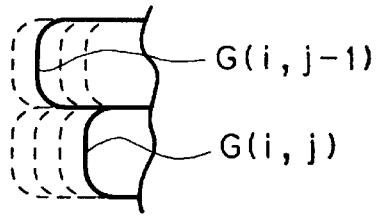
FIGS. 12A, 12B and 12C are plans showing a state in which the edge positions change following the state shown in FIGS. 11A and 11B.
Figure 12B:
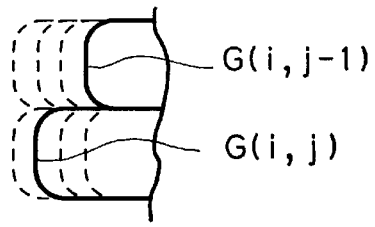
Figure 12C:
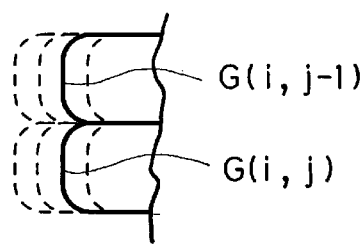
Figure 13A:
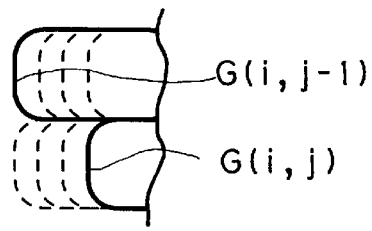
FIGS. 13A, 13B, 13C and 13D are plans showing a state in which the edge positions change following the state shown in FIGS. 12A, 12B and 12C.
Figure 13B:
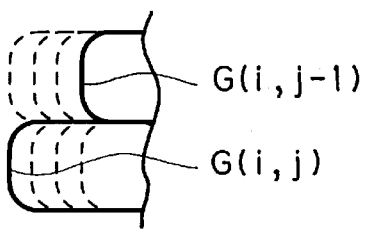
Figure 13C:
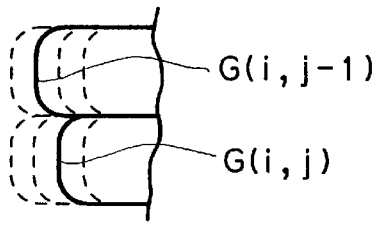
Figure 13D:
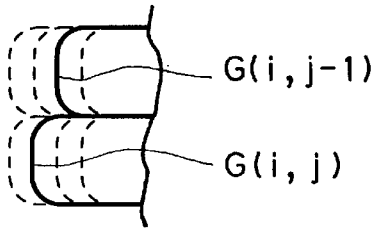

In other words, as shown in FIG. 10, when the edges of adjacent pits both have data value 0, the area is the smallest. When the edges have data values 0 and 1 (FIGS. 11(A) and 11(B)) as shown in FIG. 11, the area increases. When the edges have data values of 0 and 2 (FIGS. 12(A) and 12(B)), or both have data value 1 (FIG. 12(C)) as shown in FIG. 12, the area further increases. When the edges have data values of 0 and 3 (FIGS. 13(A) and 13(B)), or have data values of 1 and 2 (FIGS. 13(C) and 13(D)) as shown in FIG. 13, the area still further increases.

Figure 14A:
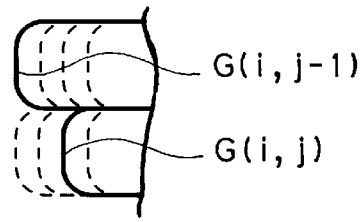
FIGS. 14A, 14B and 14C are plans showing a state in which the edge positions change following the state shown in FIGS. 13A, 13B, 13C and 13D.
Figure 14B:
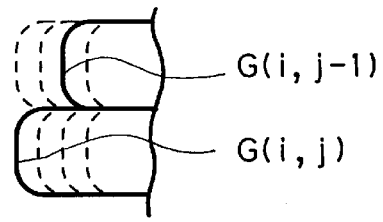
Figure 14C:
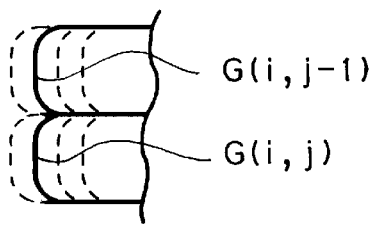
Figure 15A:
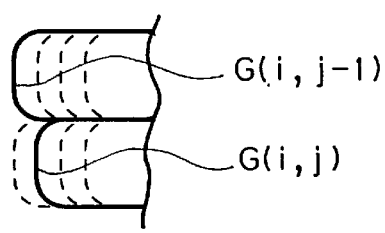
FIGS. 15A and 15B are plans showing a state in which the edge positions change following the state shown in FIGS. 14A, 14B, and 14C.
Figure 15B:
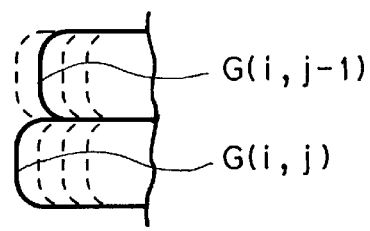
Figure 16:
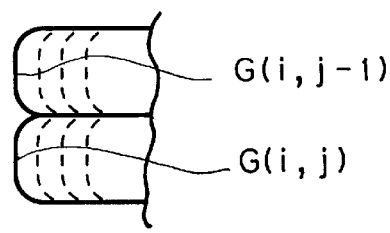
FIG. 16 is a plan showing a state in which adjacent pits have their edges at the outermost positions following the state shown in FIG. 15.

When the edges have data values of 1 and 3 (FIGS. 14(A) and 14(B)), or both have data value 2 (FIG. 14(C)) as shown in FIG. 14, the area further increases. When the edges have data values of 2 and 3 (FIGS. 15(A) and 15(B)) as shown in FIG. 15, and both have data value 3 as shown in FIG. 16, the area further increases in that order.

FIG. 17 shows the relationship among input data D2, output data D3 in the preceding circuit 20, and seven data values (hereinafter called area values) from 0 to 6 each being assigned to the corresponding area shown in FIGS. 10 to 16. In the present embodiment, the low-order two bits of the area value which is expressed in three bits represent the original data D2 (D(i, j)). In FIG. 17, a pit formed earlier is shown at the left.

To reproduce the original data D2 from this relationship during reproduction, data D2 is compensated for in the precoding circuit 20 such that the low-order two bits of the digitalized area value formed by data value G(i, j-1) specified only by a pit on one track which causes inter-code interference and data value D3 specified only by the pit formed by data D2 indicate the real data value G(i, j) of the data D2.

Figure 18:
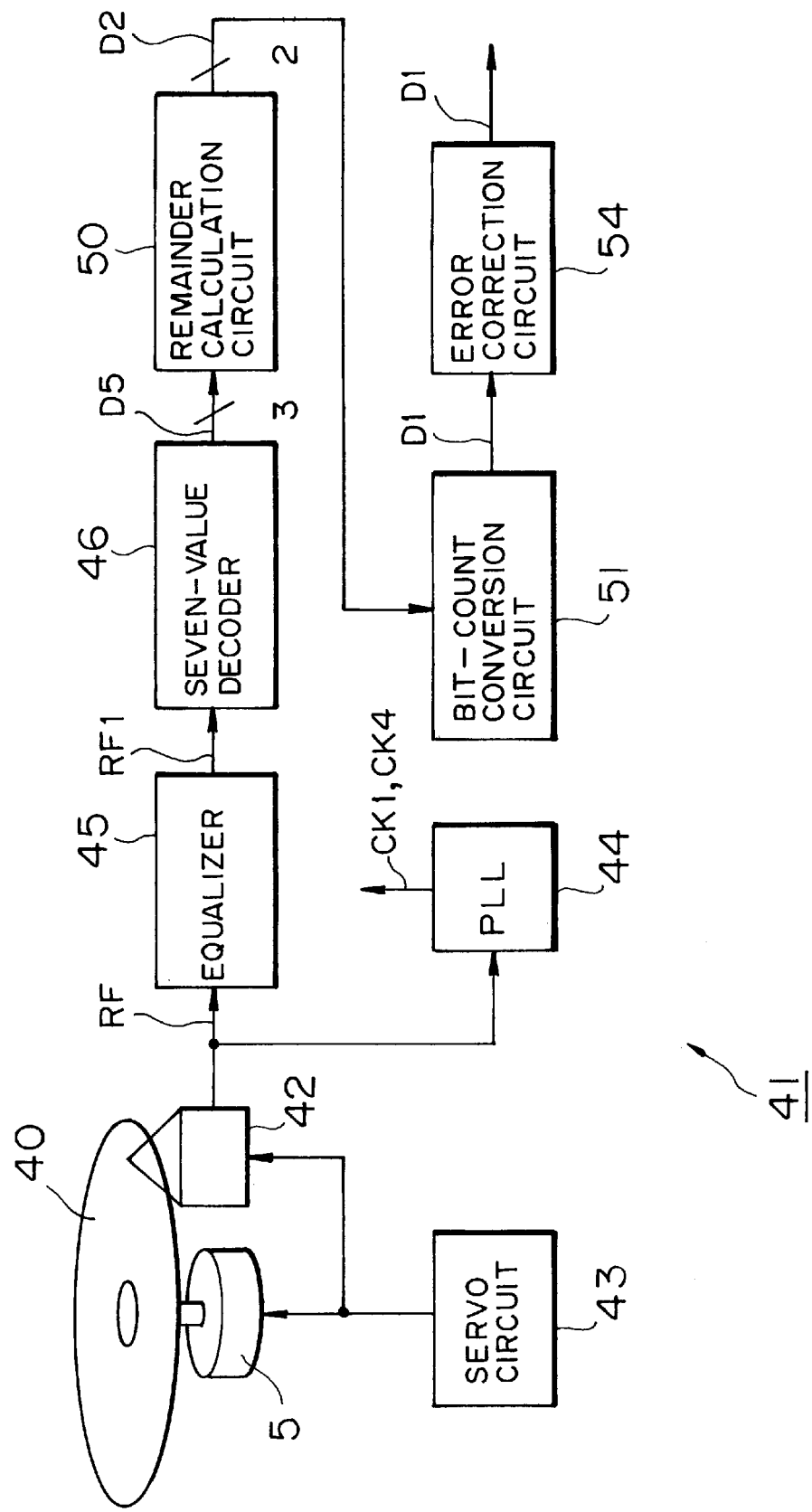
FIG. 18 is a block diagram of a reproduction apparatus for an optical disk made by the optical disk apparatus shown in FIG. 2.

FIG. 18 is a block diagram of an optical disk apparatus for reproducing an optical disk 40 made from the original disk 4. In this optical disk apparatus 41, a spindle motor 5 is controlled by a servo circuit 43 and rotates the optical disk 40.

Figure 19:
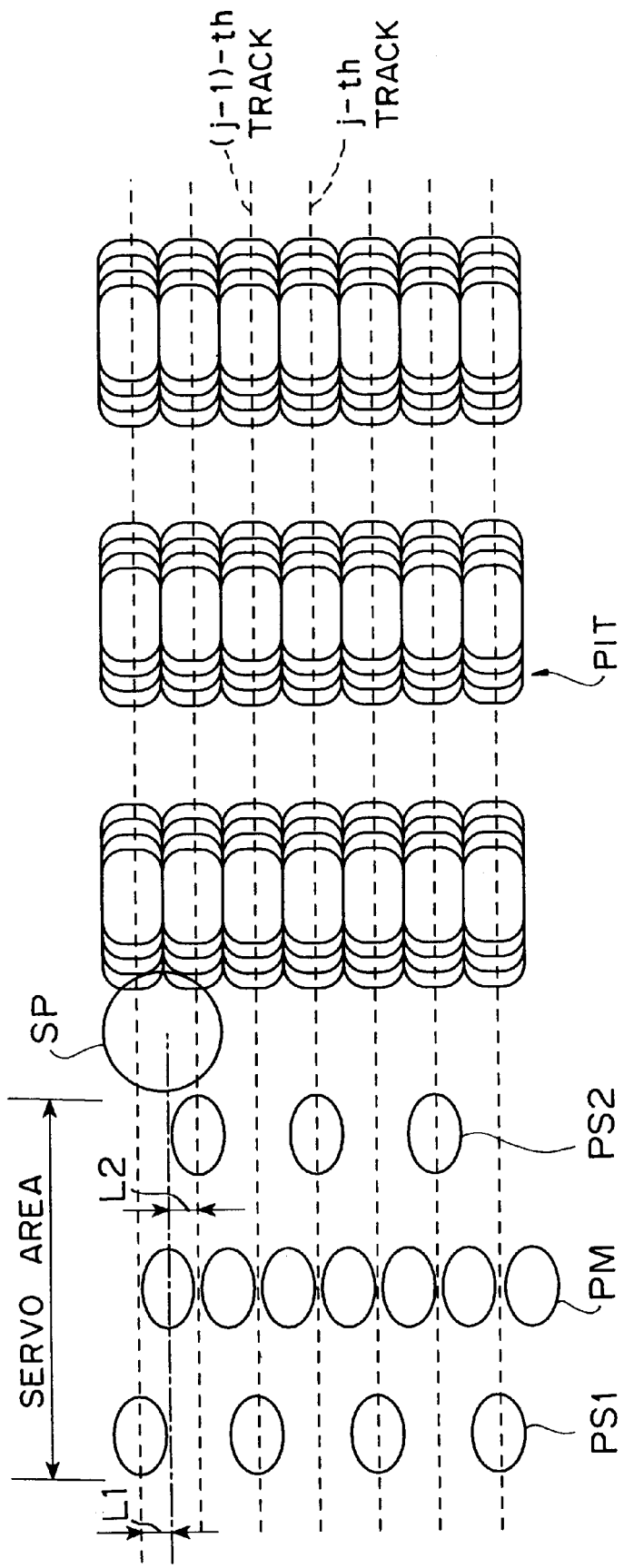
FIG. 19 is an outlined view for tracking in the optical disk apparatus shown in FIG. 18.

An optical pickup 42 emits a laser beam to the optical disk 40 in this condition and receives return light. In the optical pickup 42, the wavelength $\lambda$ of the laser beam and the numerical aperture NA satisfy the relationship of $\delta < 1.22\lambda/(2NA)$ against the track pitch $\delta$, and a laser spot SP having a diameter about twice the track pitch $\delta$ is formed as shown in FIG. 19. Therefore, the optical pickup 42 outputs a light-receiving result which receives inter-code interference from an adjacent track.

The optical pickup 42 outputs a reproduction signal RF which changes its signal level depending on the amount of returned light and a focus error signal which changes its signal level according to the amount of a focus error. A PLL circuit 44 generates an edge clock CK1 and a byte clock CK4 by using as references the periods at which servo pits PS1, PM, and PS2 are formed in a servo area according to the signal level of the reproduction signal RF. The edge clock CK1 and the byte clock CK4 generated in this reproduction system are formed with a delay of a half period of the edge clock CK1 of the recording system against the edge clock CK1 and the byte clock CK4 used in the recording system described above by referring to FIG. 8. Therefore, the PLL circuit 44 forms the edge clock CK1 and the byte clock CK4 such that the rising edges of the edge clock CK1 and the byte clock CK4 correspond to the centers of the changes at the front and back edges of each pit which shift in the circumferential direction of the optical disk 40.

The servo circuit 43 moves the objective of the optical pickup 42 according to the focus error signal output from the optical pickup 42 to perform focus control of the optical pickup 42.

The servo circuit 43 samples and holds the signal levels of reproduction signals RF for the servo pits PS1, PM, and PS2 in the servo area by using as references the byte clock CK4 and the edge clock CK1. The servo circuit 43 also generates a difference signal from the result of the sample and hold of the servo pits PS1 and PS2 at both sides, and generates a tracking error signal by dividing this difference signal by the result of the sampling and holding of the center servo pit PM. The servo circuit 43 moves the objective of the optical pickup 42 in the radial direction of the optical disk 40 according to this tracking error signal.

The servo circuit 43 performs tracking control of the optical pickup 42 by the use of a so-called sample servo such that the signal levels of the reproduction signals RF obtained from the servo pits PS1 and PS2 made at both sides are equal, namely, the center of the beam spot SP is disposed at an equal distance, L1 and L2, from the serve pits PS1 and PS2 made at both sides.

In this tracking control, the servo circuit 43 switches the polarity of a tracking error signal between data reproduction from an even-number track and that from an odd-number track to handle servo pits which change their arrangement in the radial direction in units of two tracks.

As described above, since the servo pits PS1, PM, and PS2 are formed with a shift of a half-track pitch in the radial direction on the optical disk 40, the servo circuit 43 performs tracking control such that the center of scanning is positioned at the center between the track from which data is reproduced and the track immediately before. Then, the beam spot SP scans the track from which data is to be reproduced and the immediately preceding track at the same time, and the optical pickup 42 outputs a reproduction signal RF made by inter-code interference between these two tracks. The servo circuit 43 is controlled by a system control circuit (not shown) and moves the optical pickup 42 in the radial direction of the optical disk 40 according to the low-frequency component of a tracking error signal generated in this way to perform sled control.

An equalizer 45 is formed by, for example, an adaptive-equalization-type transversal filter. It compensates for the frequency characteristics of a reproduction signal RF and removes inter-code interference in the circumferential direction of the optical disk 40.

Figure 20:
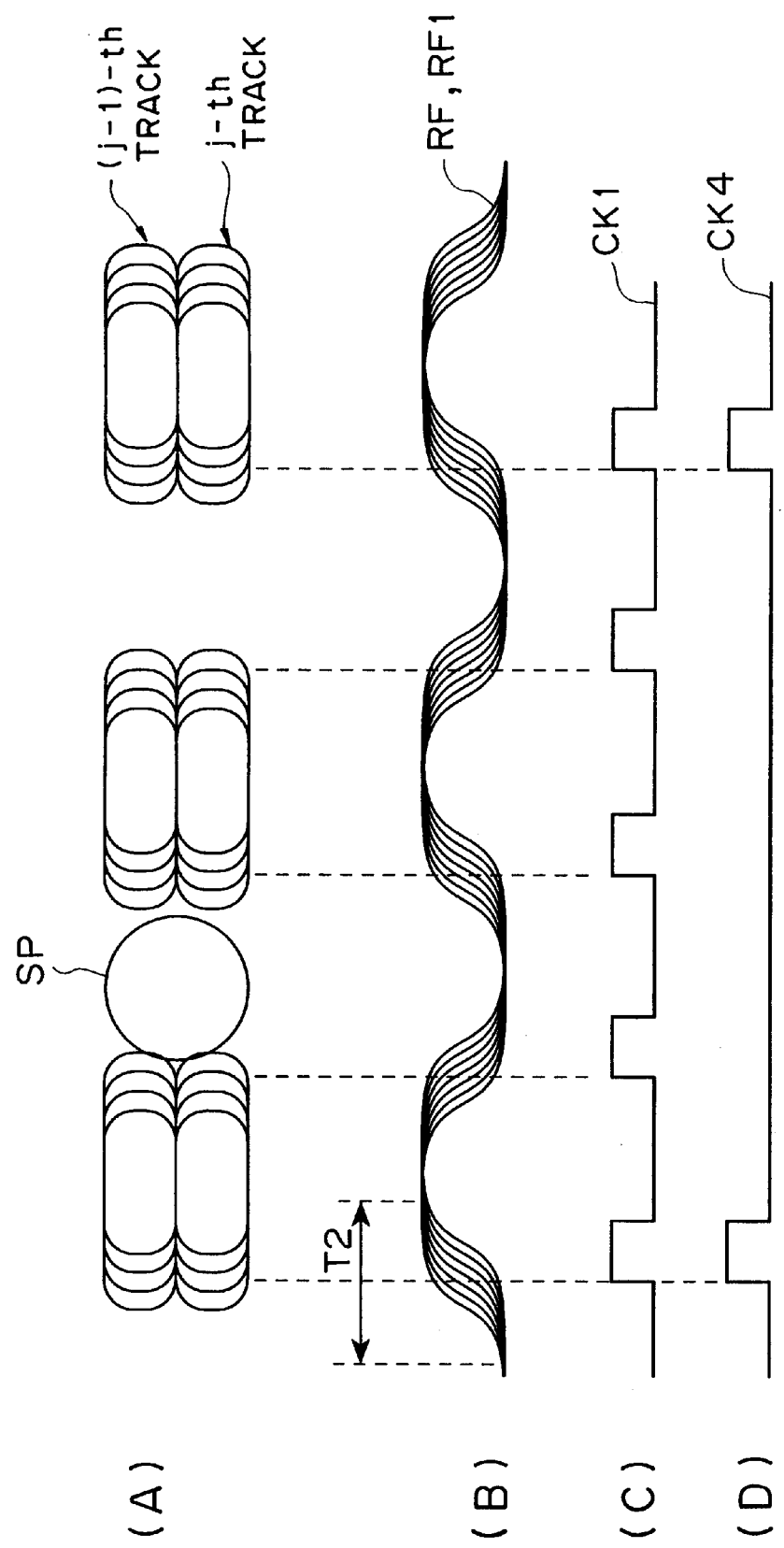
FIG. 20 (including subparts A–D) is a signal waveform chart for a reproduction signal in the optical disk apparatus shown in FIG. 18.

A seven-value decoder 46 decodes a reproduction signal RF1 output from the equalizer 45 and outputs it. As shown in FIG. 20, two tracks are scanned at the same time (FIG. 20(A)) in the optical disk apparatus 41. Since the area value can change to any of seven levels at each edge as described by referring to FIG. 17, the signal level of a reproduction signal RF (RF1) at the transitional response period T2 changes to any of seven levels (FIG. 20(B)) according to the edge positions.

Figure 21:
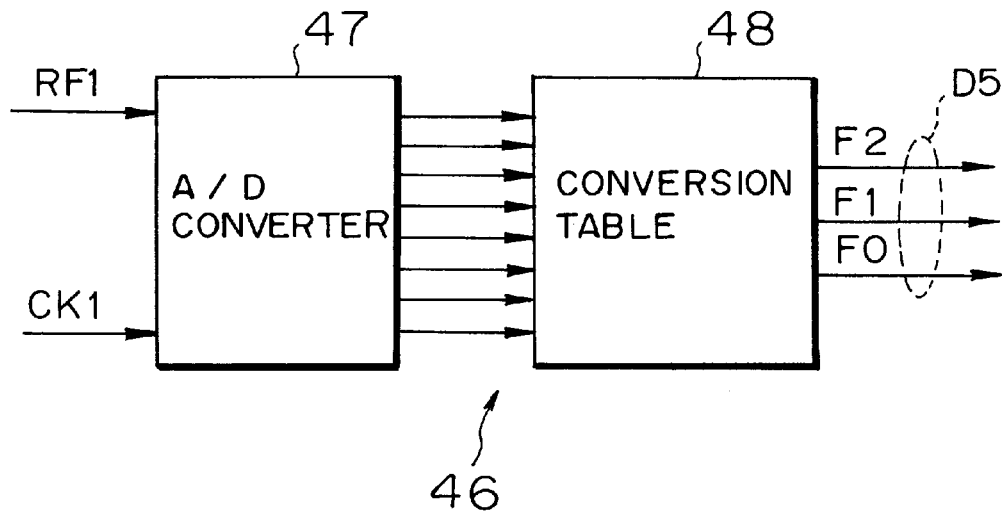
FIG. 21 is a block diagram of a seven-value decoder in the optical disk apparatus shown in FIG. 18.
Figure 22:
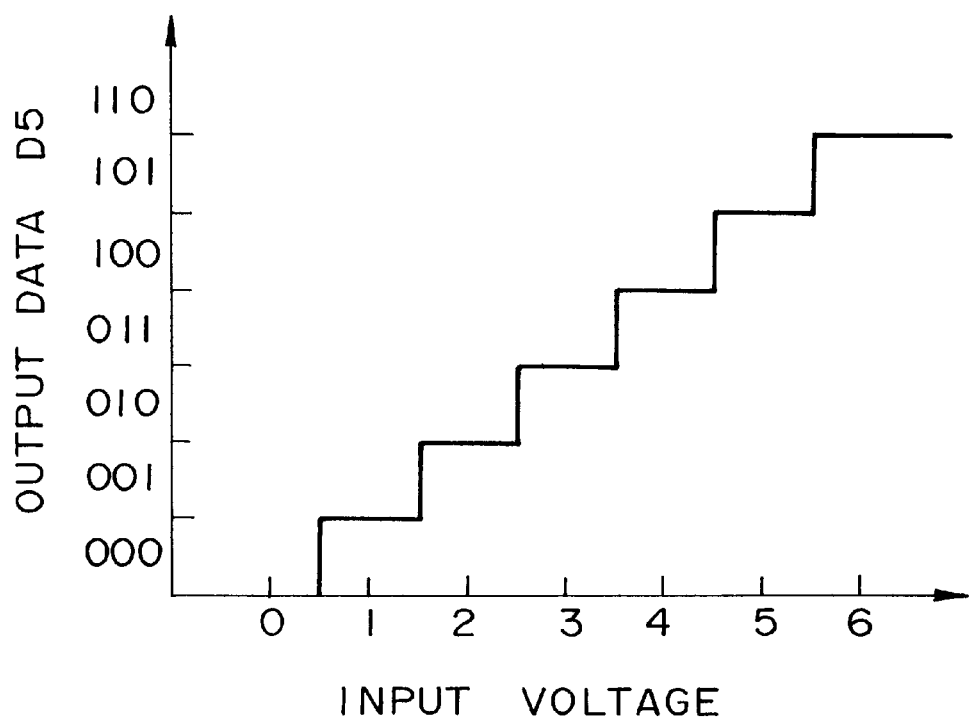
FIG. 22 is a characteristic curve chart showing the input-output characteristics of the seven-value decoder shown in FIG. 21.

The seven-value decoder 46 detects the signal level of a reproduction signal RF1 at the timing corresponding to the center of a change at each edge by using the edge clock CK1 (FIG. 20(C)) as a reference, and converts the reproduction signal RF into three-bit reproduction data D5 by the use of the detected signal level. More specifically, as shown in FIG. 21, an analog-to-digital (A/D) converter 47 reads the reproduction signal RF1 at the timing of a rising edge of the edge clock CK1, converts it to a digital signal, and outputs an eight-bit digital signal generated by detecting the signal level of the reproduction signal RF1. A conversion table 48 is formed by a read-only memory circuit and converts the digital signal into a three-bit reproduction signal D5 and outputs it. With this configuration, by the use of the input-output characteristics shown in FIG. 22 as a whole, the seven-value decoder 46 outputs three-bit reproduction data D5 corresponding to the signal level at the transitional response period T2, which changes according to the area value described by referring to FIG. 17.

A remainder calculation circuit 50 calculates a remainder from reproduction data D5 with a modulus of 4 to decode and output reproduction data D2 (G(i, j) in FIG. 17) on the j-th track to be reproduced. The remainder calculation circuit 50 selectively outputs the low-order two bits from three-bit input data D5 to perform this remainder calculation.

Figure 23:
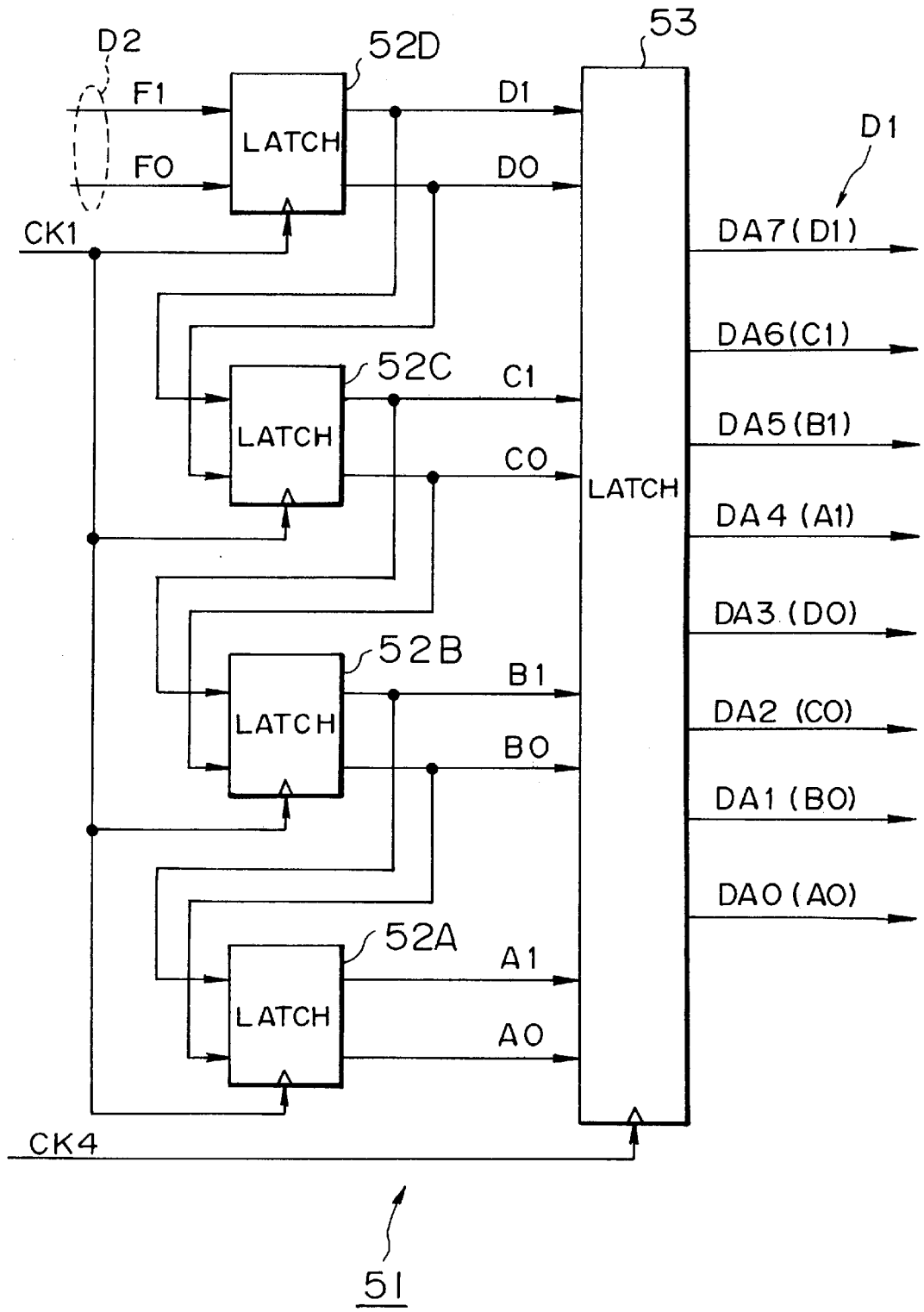
FIG. 23 is a block diagram of a bit-count conversion circuit in the optical disk apparatus shown in FIG. 18.

A bit-count conversion circuit 51 converts this two-bit reproduction data D2 into eight-bit parallel data D1 and outputs it. More specifically, as shown in FIG. 23, four latch circuits 52A to 52D are connected in series and operate with the edge clock CK1, and reproduction data D2 is sequentially transferred to these latch circuits 52A to 52D in the bit-count conversion circuit 51. An eight-bit latch circuit 53 latches the outputs of the latch circuits 52A to 52D at the timing of the byte clock CK4, converts four sets of two-bit reproduction data D2 into the original eight bit data D1 and outputs it.

An error-correction circuit (ECC) 54 corrects errors in the data D1 by the use of the error correction code attached during recording and outputs it.

To summarize, the error correction code adding circuit 13 attaches an error correction code to eight-bit parallel input data D1 (FIG. 2), and the data D1 is converted into two-bit-parallel data D2 in the bit-count conversion circuit 14.

In the precoding circuit 20, this data D2 is subtracted from data D3 recorded on one track previous of the original disk 4, and new remainder data D3 is calculated with a modulus of 4. With this operation, the data D2 is compensated for such that inter-code interference is canceled during reproduction. In other words, the data D2 is converted into remainder data D3 such that a constant relationship is maintained between the data specified only by the pit formed from this data D2 and the data specified only by the pit made on one track previous. The data D2 is compensated for such that the original data D2 can be decoded during reproduction by the use of this relationship even if inter-code interference from an adjacent track occurs.

Fixed data for sample servo output from the fixed-pattern generator 29 is inserted into the remainder data D3 generated as described above, and the resultant data is input to the edge modulator 30. The optical disk apparatus 1 generates a modulation signal S1 caused by an edge-position change, according to the output data D3, and exposes the original disk 4 by the use of this modulation signal S1 (FIG. 8(D)).

While the original disk 4 is driven at a constant angular velocity, the disk is exposed in synchronization with its rotation according to the FG signal FG, and pits are formed in lines in adjacent tracks in the radial direction of the original disk 4 (FIG. 1). Since, unlike a compact disc system, the feed speed of the mirror 9 and the objective 10 is set smaller than the rotation speed of the original disk 4, adjacent pits are formed very densely in the radial direction to form tracks very densely in the radial direction such that inter-code interference is generated with an adjacent track during reproduction.

Since a laser beam L is on-off controlled by the modulation signal S1 according to the output data D3, pits are sequentially formed such that the positions of the front and back edges of a pit change in a step-like manner according to the remainder data D3 by using the distance corresponding to a specified period shorter than the transitional response time as a unit. Servo pits PS1, PM, and PS2 are formed by the fixed data for sample servo such that these pits change their arrangement in the radial direction in units of two tracks and are offset by a half track.

The original disk 4 exposed in this way is made into a mother disk through processes including electrical plating. From the mother disk, a stamper is made, and an optical disk 40 (FIG. 18) is made by the stamper.

In the optical disk apparatus 41, while the optical disk 40 (FIG. 18) is rotated at a constant angular velocity by sample servo with servo pits PS1, PM, and PS2 used as references, a laser spot SP scans adjacent tracks at the same time, and a reproduction signal RF, which changes its signal level according to the amount of the laser beam returned, is detected.

The frequency characteristics of the reproduction signal RF are compensated for by the equalizer 45, and the signal is converted into an eight-bit digital signal (FIG. 21) at the timing corresponding to the center of a change at each edge by the seven-value decoding circuit 46. The digital signal is further converted into three-value reproduction data D5. The positional information at the front and back edges of each pit is detected together with the positional information of an adjacent pit.

The low-order two bits of this reproduction signal D5 are taken by the remainder calculation circuit 50 to generate remainder data D2 with a modulus of 4, and the original two-bit data D2 is obtained by removing inter-code interference caused by an adjacent track. The successive four words of this two-bit data D2 are collectively converted into eight-bit parallel data D1 by the bit-count conversion circuit 51, and the original data D1 is obtained.

With the above configuration, recording density is increased in the radial direction of an optical disk by forming tracks densely so as to cause inter-code interference between adjacent tracks and by specifying the shapes of pits so as to cancel the inter-code interference. In an experiment, tracks were formed densely at a track pitch of 0.5 μm and data on each track could be reproduced by an optical pickup having a wavelength of 650 nm and a numerical aperture NA of about 0.55. As a result of this experiment, it was confirmed that recording density could be increased to about twice that for a conventional system.

In the above embodiment, pits are formed in lines in adjacent tracks at a constant angular velocity. The present invention, however, is not limited to this arrangement. The present invention can be applied to a case in which pits are sequentially formed with a constant relationship with pits on an adjacent track. Pits may be formed such that the pits and lands are put side by side on adjacent tracks. In this case, the present invention can be applied to a case in which an optical disk is driven at a constant linear velocity.

In the above embodiment, the low-order two bits are used from the result of seven-value decoding, namely a remainder modulo 4 is obtained from the reproduction result. The present invention, however, is not limited to this method. It is required that the data to be recorded be compensated for in advance such that inter-code interference from an adjacent track is canceled and reproduction data be handled according the compensation applied to the data during recording. Various handling methods can be used, such as a method in which data is compensated for in advance of recording such that an operation is further applied to a remainder modulo 4 to obtain the original data.

In the above embodiment, the front and back edges change to any of four levels. The present invention is not limited to this form, and can be applied to a case in which the edges change to any of a plurality of levels as required.

In the above embodiment, the signal level of a reproduction signal is detected by using the edge clock as a reference to generate reproduction data D5. The present invention, however, is not limited to this form. It is required that the area value be detected by the use of a reproduction signal as a reference. The present invention can be applied to various methods for detecting edge position information, such as a method in which a reproduction signal is changed to a binary signal and the edge timing of this binary signal is detected to obtain reproduction data D5.

In the above embodiment, tracks are densely made such that inter-code interference is generated between two adjacent tracks. The present invention is not limited to this form, however, and can be applied to a case in which tracks are densely formed such that inter-code interference is generated among three or more tracks.

In the above embodiment, pits are formed on the original glass disk and the desired data is recorded. The present invention is not limited to this form, however, and can be applied to many cases, such as a case in which various data is recorded in a so-called write-once optical disk apparatus, a case in which various types of information are recorded by changing the edges of pits or marks on a rewritable optical disk or on a magneto-optical disk, and a case in which various types of information is recorded by changing the magnetic strength of a mark in a step-like manner.

As described above, according to the present invention, since tracks are densely made such that inter-code interference is generated between adjacent tracks, and pits or marks are formed such that this inter-code interference is canceled, recording density is increased in the radial direction of an optical disk.

What is claimed is:

1. An optical disk comprising:
   a recording surface in which pits or marks are sequentially formed to form tracks and desired data is recorded by using said pits or said marks,
   wherein said tracks are densely formed such that inter-code interference is generated between adjacent tracks,
   wherein said pits or said marks are formed such that said intercode interference is canceled, and
   wherein the data specified only by a pit or mark changes according to the data specified only by a pit or mark disposed adjacently to the former pit or the former mark in a radial direction,
   a constant relationship is maintained for positions where said pits or said marks are formed, between adjacent tracks, and
   said pits or said marks are formed such that their edge positions change in a step-like manner by using as a unit a distance corresponding to a specified period shorter than the transitional response period of a reproduction signal for a pit or a mark, said transitional response period being determined by the transfer function of a reproduction optical system.

2. An optical disk according to claim 1, wherein pits or marks for tracking control are formed such that their arrangement changes in the radial direction in units of a plurality of tracks at a constant interval.

3. An optical disk apparatus, comprising:
   a disk-shaped recording medium including a recording surface on which pits or marks are sequentially formed to form tracks and the desired data is recorded by using said pits or said marks, wherein said tracks are densely formed such that intercode interference is generated between adjacent tracks, and said pits or said marks are formed such that said intercede interference is canceled,
   wherein the data specified only by a pit or mark changes according to the data specified only by a pit or mark disposed adjacently to the former pit or the former mark in a radial direction,
   a constant relationship is maintained for positions where said pits or said marks are formed, between adjacent tracks, and
   said pits or said marks are formed such that their edge positions change in a step-like manner by using as a unit a distance corresponding to a specified period shorter than the transitional response period of a reproduction signal for a pit or a mark, said transitional response period being determined by the transfer function of a reproduction optical system; and
   means for reading the recording medium.

4. An optical disk apparatus according to claim 3, wherein said pits or said marks are formed on the recording surface of the recording medium such that constant relationships are maintained between the data to be recorded and data specified only by a pit or mark and between the data to be recorded and data specified only by a pit or mark disposed adjacently to the former pit or the former mark in the radial direction.

5. An optical disk apparatus according to claim 4, wherein said pits or said marks are formed such that a constant relationship is maintained for positions where said pits or said marks are formed, between adjacent tracks, and said pits or said marks are formed such that their edge positions change in a step-like manner by using as a unit the distance corresponding to a specified shift period shorter than the transitional response period of a reproduction signal for a pit or a mark, said transitional response period being determined by the transfer function of a reproduction optical system.

6. A recording method for an optical disk comprising the steps of:

forming tracks densely such that inter-code interference is generated between adjacent tracks, and forming pits or marks such that said inter-code interference is canceled, wherein said pits or said marks are formed such that constant relationships are maintained between the data to be recorded and data specified only by a pit or mark and between the data to be recorded and data specified only by a pit or mark disposed adjacently to the former pit or the former mark in the radial direction, and wherein said pits or said marks are formed such that a constant relationship is maintained between adjacent tracks for positions where said pits or said marks are formed, and said pits or said marks are formed such that their edge positions chance in a step-like manner by using as a unit the distance corresponding to a specified shift period shorter than the transitional response period of a reproduction signal for a pit or a mark, said transitional response period being determined by the transfer function of a reproduction optical system.

7. A recording method for an optical disk according to claim 6, wherein pits or marks for tracking control are formed such that their arrangement changes in the radial direction in units of a plurality of tracks at a constant interval.

* * * * *